US010823182B2

(12) United States Patent
Duke

(10) Patent No.: US 10,823,182 B2
(45) Date of Patent: Nov. 3, 2020

(54) ADJUSTABLE SPRING TENSION CLIP FOR EXTERNAL DAMPER AGRICULTURAL FANS

(71) Applicant: The GSI Group LLC, Assumpton, IL (US)

(72) Inventor: Brian Daniel Duke, Assumption, IL (US)

(73) Assignee: The GSI Group, LLC, Assumption, IL (US)

( * ) Notice: Subject to any disclaimer, the term of this patent is extended or adjusted under 35 U.S.C. 154(b) by 99 days.

(21) Appl. No.: 16/131,271

(22) Filed: Sep. 14, 2018

(65) Prior Publication Data

US 2019/0093663 A1 Mar. 28, 2019

Related U.S. Application Data

(60) Provisional application No. 62/562,122, filed on Sep. 22, 2017.

(51) Int. Cl.
*F04D 25/14* (2006.01)
*E05F 1/10* (2006.01)
(Continued)

(52) U.S. Cl.
CPC ............ *F04D 25/14* (2013.01); *E05F 1/1083* (2013.01); *F04D 25/088* (2013.01);
(Continued)

(58) Field of Classification Search
CPC ..... F04D 25/14; E05F 1/1083; F24F 13/1413; F24F 13/1426; F24F 2013/146; Y10T 137/7839; Y10T 137/7898; Y10T 137/7845; F16K 15/038; F16K 15/033; F16K 15/036; F16K 1/223
(Continued)

(56) References Cited

U.S. PATENT DOCUMENTS 1,708,907 A * 4/1929 Spencer ................ F16K 15/038
137/512.1
2,775,928 A * 1/1957 Morrison ................ F24F 13/15
454/344

(Continued)

*Primary Examiner* — Edelmira Bosques
*Assistant Examiner* — Christopher Matthew Odell

(57) ABSTRACT

In one embodiment, a system, comprising: a damper assembly, the damper assembly comprising: a structural member; at least one door pivotably coupled to the structural member; a clip connected to the damper assembly and comprising plural spring end constraining segments; a spring comprising a first end and a second end, wherein at least the first end comprises a hook, the spring coupled at the first end to one of the plural spring end constraining segments and at the second end fixably coupled to the damper assembly, the clip configured to accept a hookable connection to the spring at any one of the plural spring end constraining segments, each of the plural spring end constraining segments constraining movement of the hook, when connected thereto, during opening and closing of the at least one door, wherein the spring is at a first tension when hooked to the one of the plural spring end constraining segments and at a second tension when hooked to another of the plural spring end constraining segments.

20 Claims, 9 Drawing Sheets

(51) Int. Cl.

| | |
|---|---|
| ***F24F 13/14*** | (2006.01) |
| ***F04D 25/08*** | (2006.01) |
| ***F04D 29/60*** | (2006.01) |
| ***F24F 7/007*** | (2006.01) |
| ***F16K 15/03*** | (2006.01) |
| ***F16K 1/22*** | (2006.01) |

(52) U.S. Cl.
CPC ........ *F04D 29/601* (2013.01); *F24F 13/1413* (2013.01); *F24F 13/1426* (2013.01); *E05Y 2201/48* (2013.01); *E05Y 2600/60* (2013.01); *E05Y 2900/132* (2013.01); *F24F 7/007* (2013.01); *F24F 2013/146* (2013.01)

(58) Field of Classification Search
USPC ........ 454/333, 264–268, 311, 318, 325–326, 454/334–336; 137/512.1, 512.5, 527
See application file for complete search history.

(56) References Cited

U.S. PATENT DOCUMENTS 4,794,852 A * 1/1989 Ee ........................ F24F 13/1413 454/271
5,236,391 A * 8/1993 Schaefer .............. A01K 1/0064 454/253
5,249,596 A * 10/1993 Hickenlooper, III ........................ F24F 13/1426 137/334

* cited by examiner

ADJUSTABLE SPRING TENSION CLIP FOR EXTERNAL DAMPER AGRICULTURAL FANS

CROSS REFERENCE TO RELATED APPLICATION

This application claims the benefit of U.S. Provisional Application No. 62/562,122 filed Sep. 22, 2017, which is hereby incorporated by reference in its entirety.

TECHNICAL FIELD

The present disclosure is generally related to external damper fans, and in particular, damper door tension adjustment mechanisms for external damper fans.

BACKGROUND

Presently, the damper doors on external damper fans are blown open by the fan when it turns on. After the fan is powered off by, for instance, automatic environmental controls in the building, the damper doors are pulled closed with springs. One issue is that the doors sometimes do not close sufficiently (or at all) due to varying environmental factors, such as prevailing wind speeds and low static pressure in the building. Moreover, when only a first fan in a sequence of fans is running, the springs perform all the work in closing the doors without the assistance of negative static pressure in the building. If the spring is not tight enough, it will not pull the doors to a closed position due to these varying situations. Another issue with damper doors historically is, if the spring is too tight, it will not allow the doors to open fully during operation, which may compromise fan performance and may, at least minimally, impact animal grow out weight. In order for a damper door to be fully open during fan operation, the spring should be somewhat loose when the door is in the closed state. Some manufacturers set this spring tension in the factory in one position that is designed only to maximize fan performance. Many end users (especially in colder climates) do not like the one position spring tension setting because of some of the problems described above, and in fact, may rather have the doors close every time and deal with the slight fan performance drop as the slight performance drop in building wind speed across the animals is much less costly than venting heat into the atmosphere during the winter through a non-closed damper door.

Hence, there is a need to enable a simple and effective adjustment to the damper door operation, which will allow each individual customer to customize spring tension to their specific needs and/or desires.

BRIEF DESCRIPTION OF THE DRAWINGS

Many aspects of certain embodiments of the disclosure can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

Figure 1:
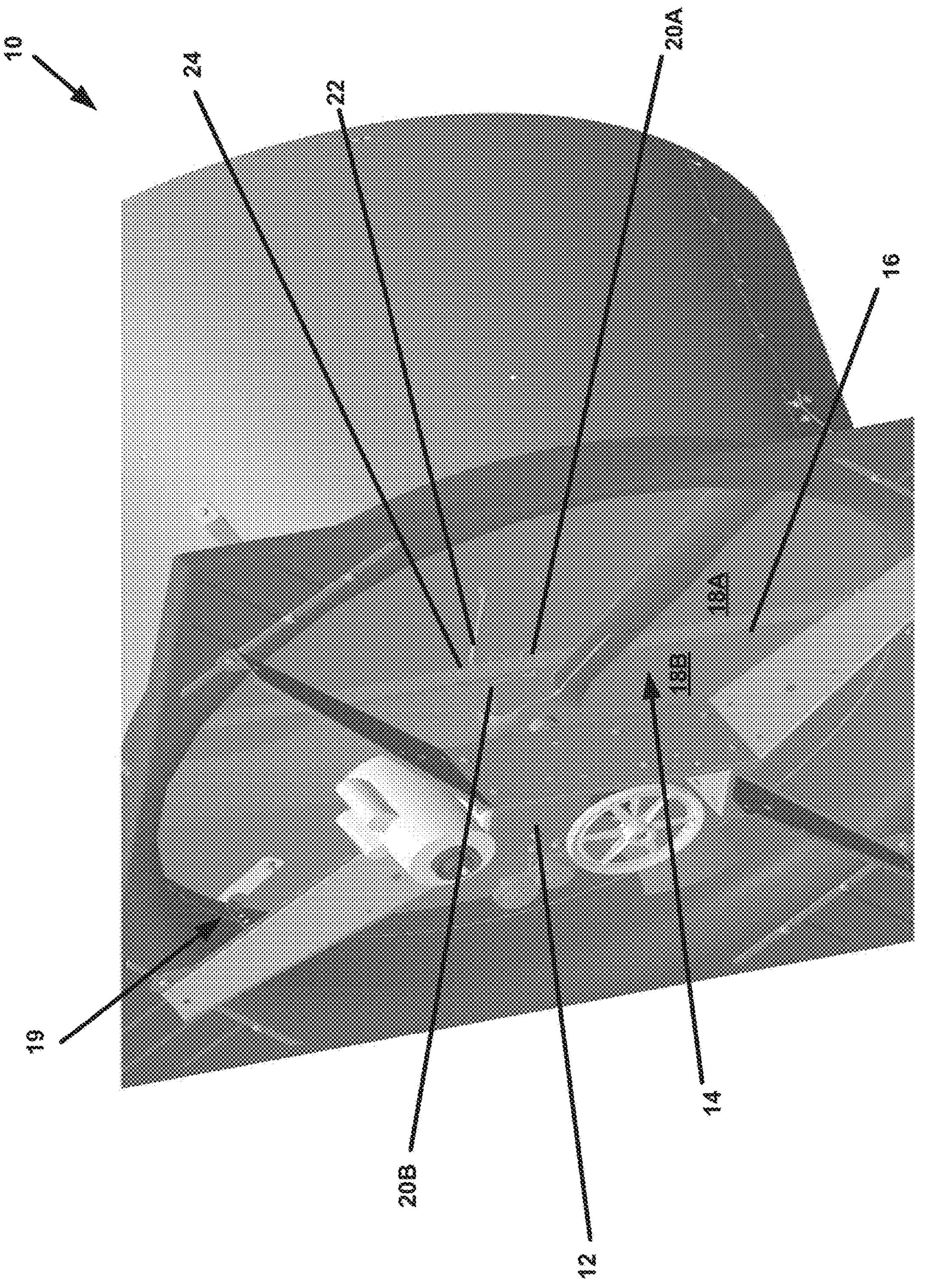
FIG. 1 is a schematic diagram that illustrates in front perspective view an example environment in which an embodiment of damper door tension adjustment system may be used.

In one embodiment, a system, comprising: a damper assembly, the damper assembly comprising: a structural member; at least one door pivotably coupled to the structural member; a clip connected to the damper assembly and comprising plural spring end constraining segments; a spring comprising a first end and a second end, wherein at least the first end comprises a hook, the spring coupled at the first end to one of the plural spring end constraining segments and at the second end fixably coupled to the damper assembly, the clip configured to accept a hookable connection to the spring at any one of the plural spring end constraining segments, each of the plural spring end constraining segments constraining movement of the hook, when connected thereto, during opening and closing of the at least one door, wherein the spring is at a first tension when hooked to the one of the plural spring end constraining segments and at a second tension when hooked to another of the plural spring end constraining segments.

DETAILED DESCRIPTION

Certain embodiments of a damper door tension adjustment system are disclosed that includes one or more damper doors pivotable about a structural member and a clip and spring assembly operatively coupled to each door that enables a person (e.g., personnel, contractor, etc.) to move the spring along the clip to easily adjust the tension of the spring and hence the closing and opening forces imposed on the damper door(s). In one embodiment, the clip comprises plural spring end constraining segments, each of which is configured to accept a hook of the spring. Each of the spring end constraining segments, when respectively connected to the hook of the spring, constrain movement of the hook to a limited amount (e.g., no significant movement, generally limited to an area including and adjacent to a rounded or angular point or bounded segment) along the clip when the door is swung open by positive air pressure from an external damper fan in operation or closed by the spring upon deactivation (turned off) of the external damper fan. Certain embodiments of a damper door tension adjustment system enable a person to make a spring tension choice that best suits their unique situation, and enable them to make that choice easily and quickly without the use of hand tools and/or engaging in laborious tasks.

Digressing briefly, as indicated above, spring tension is generally set once at the factory based on judicious considerations of external damper fan performance and environmental control. Adjustments to the damper opening and closing forces in the past were either left to the factory (i.e., accepting the sub-optimal performance) or made with some hand and tool efforts in the field. Through the use of certain embodiments of a damper door tension adjustment system, field adjustment is easily performed without the use of tools, enabling external damper fan operation according to the specific needs and/or design requirements of the end user.

Having summarized certain features of a damper door tension adjustment system of the present disclosure, reference will now be made in detail to the description of a damper door tension adjustment system as illustrated in the drawings. While a damper door tension adjustment system will be described in connection with these drawings, there is no intent to limit it to the embodiment or embodiments disclosed herein. For instance, though emphasis is placed on external damper fans for agricultural applications, it should be appreciated by one having ordinary skill in the art in the context of the present disclosure that certain embodiments of a damper door tension adjustment system may be beneficially deployed for damper adjustment applications in industrial or other commercial, governmental, or residential industries, including greenhouse ventilation systems. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the principles and scope of the disclosure as defined by the appended claims. Further, it should be appreciated in the context of the present disclosure that the claims are not necessarily limited to the particular embodiments set out in the description.

FIG. 1 is a schematic diagram that illustrates in front perspective view an example environment 10 in which an embodiment of damper door tension adjustment system may be used. The example environment 10 includes an external damper fan 12 of any known design, and a damper assembly 14 located downstream of the external damper fan 12. The damper assembly 14 comprises a structural member 16 and a pair of damper doors 18 (e.g., 18A, 18B) pivotably coupled (e.g., using one or more hinges) to the structural member 16. The damper doors 18 of the depicted configuration are sometimes referred to as butterfly doors due to the pivotable swing in the same direction (e.g., outward) by both doors 18A, 18B relative to the structural member 16 when the external damper fan 12 is in operation (i.e., causing positive air pressure to force the doors 18 open concurrently). In one embodiment, one or more magnets 19 (one shown) may be used to keep the door closed when the external damper fan 12 is off. For instance, four (4) magnets may used, two per door 18, though any number of magnets 19 may be positioned in any number of areas to hold the doors 18 closed. Note that the location of the magnet 19 is for illustration, and that other and/or additional locations may be used in some embodiments. In some embodiments, the magnet(s) may be omitted. As is known, the external damper fan 12 may be controlled by a switch assembly, wall plug, breaker box, or environmental controls (not shown) to which inputs of the external damper fan 12 are coupled. For instance, the switch assembly may include one of a variation of relays (for on-off outputs), 0-10 Vdc analog (for variable outputs) and inputs (e.g., universal inputs, which may include any known type, including resistance, dry contact, 0-5 Vdc, 4-20 mA or pulse. For instance, signals may be fed to the switch assembly (or other assembly as explained above) by a controller, which may, alone or in combination with other controllers of an environmental control system for a farm, activate the external damper fan 12 (or fans) via the switch assembly using any one of a plurality of available control protocols, including RS-485 among others. In some embodiments, control of the external damper fan 12 may be more rudimentary in nature, activated for instance by a local contact via feedback from a thermostat and fed by a power supply. The damper doors 18 and structural member 16 may be comprised of plastic (e.g., including composite material) or metal (e.g., galvanized metal, stainless steel, aluminum, etc.) materials.

Note that variations to the structure and/or arrangement of components of the damper assembly 14 may be used, and hence are contemplated to be within the scope of the disclosure. For instance, though shown using an upright structural member 16, in some embodiments, the structural member 16 may be oriented horizontally or at other orientations. Also, though a single structural member 16 is depicted in FIG. 1, multiple structural members may be used in some embodiments. For instance, a pair of orthogonally-positioned structural members may be used to enable pivotable action of four damper doors (e.g., four quadrants) in some embodiments, among other quantities or variations. In some embodiments, a single damper door may be used, where the structural member 16 is located to one side (as opposed to being centrally disposed relative to the external damper fan 12), wherein the single damper door swings open and closed via pivotable action relative to the side-located structural member. In some embodiments, the structural member may be located elsewhere downstream relative to the fan, such as in a top location (where the swing is upwards when opening and downwards when closing). Additionally, it is noted that the external damper fan 12 shown in FIG. 1 comprises a belt-driven fan, though it should be appreciated by one having ordinary skill in the art that external damper fans of other design types may be used, and hence are contemplated to be within the scope of the disclosure.

The damper assembly 14 shown in FIG. 1 further comprises a pair of clips and a pair of springs (one shown). In particular, a clip 20A is directly connected to one side of the structural member 16 (adjacent the door 18A), and a clip 20B is directly connected to the opposing side of the structural member 16 (adjacent the door 18B). Note that though the clips 20 are shown at the same elevation along the structural member 16, in some embodiments, their location along the structural member 16 may be offset in elevation and/or located elsewhere along the length of the structural member 16. Also, based on the alternative configurations for the doors 18 and/or the structural members 16 described above, the orientation of the clips 20 may likewise be changed consistent with those variations. For instance, a single clip 20 may be used for a damper assembly comprising a single door, or four clips 20 may be used for four doors. Further, as described below, in some embodiments, the clips 20 may be directly connected to other locations or structures of the damper assembly 14, including the door 18 (see, e.g., FIG. 10, as described below). As described further below, the clips 20 comprise plural spring end constraining segments, including spring end constraining segment 24, to which a hook disposed at the end of the spring 22 is hookably coupled and constrained in movement to a limited segment. As shown in FIG. 1, the hook of the spring 22 is coupled to the top-disposed spring end constraining segment or loop 24 of the clip 20A. Note that loop and spring end constraining segment are terms that are used interchangeably herein, though some embodiments of a spring end constraining segment may use other means to limit movement of the spring end (see, e.g., FIG. 9, described further below). The other end of the spring 22 is fixably coupled to the door 18A. The opposing clip 20B is similarly configured in geometry, structure, and function, though shown unattached to a spring for simplicity in illustration. When the hook of the spring 22 is coupled to the top-disposed spring end, a tension of a designed value is effectuated to impose a defined force that resists the opening of the door 18 based on a predetermined air flow requirement from the external damper fan 12 and pulls or retracts the door according to a defined force when the external damper fan 12 is turned off (no air flow from the fan 12). In one embodiment, the clip 20 and spring 22 functionally operate in conjunction with the one or magnets 19. When the hook of the spring 22 is coupled to one of the other loops 24, there is a difference in tension on the spring depending on which of the loops 24 the hook is coupled to. Through this design, an end user (or manufacturer) may simply hand-adjust the spring connection, such as via unhooking or sliding the hook along the clip 20, and re-attaching (or slidingly positioning) the hook to another one of the loops 24 according to the design constraints or desired damper performance.

Figure 2:
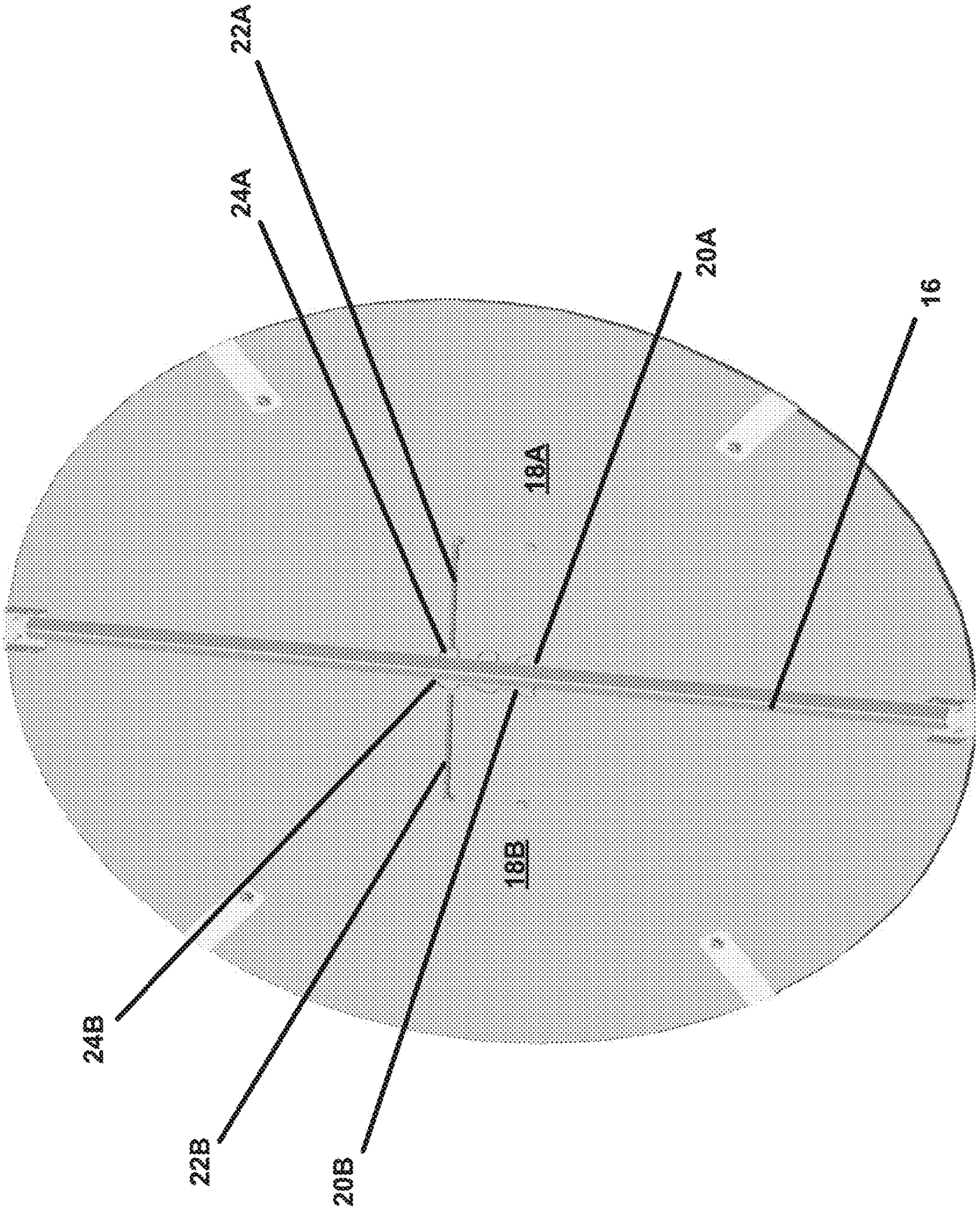
FIG. 2 is a schematic diagram that illustrates in front elevation view an embodiment of damper door tension adjustment system.

Referring to FIG. 2, shown is a schematic diagram that illustrates in front elevation view an embodiment of damper door tension adjustment system that includes the doors 18A, 18B that are pivotable about the centrally-located, vertically aligned structural member 16, and the clips 20A and 20B to which the springs 22A and 22B are respectively hooked to. As shown, one spring end of the spring 22A is hooked to the top-disposed loop 24A, which provides a defined tension for the spring 22A (and opening and closing force for the door 18A). Similarly, one spring end of the spring 22B is hooked to the top-disposed loop 24B, which provides a defined tension for the spring 22B (and opening and closing force for the door 18B). In one embodiment, a damper door tension adjustment system comprises all of the components shown in FIG. 2. In some embodiments, a damper door tension adjustment system comprises fewer than all of those components, and in some embodiments, additional components (e.g., including the external damper fan 12, FIG. 1).

Figure 3:
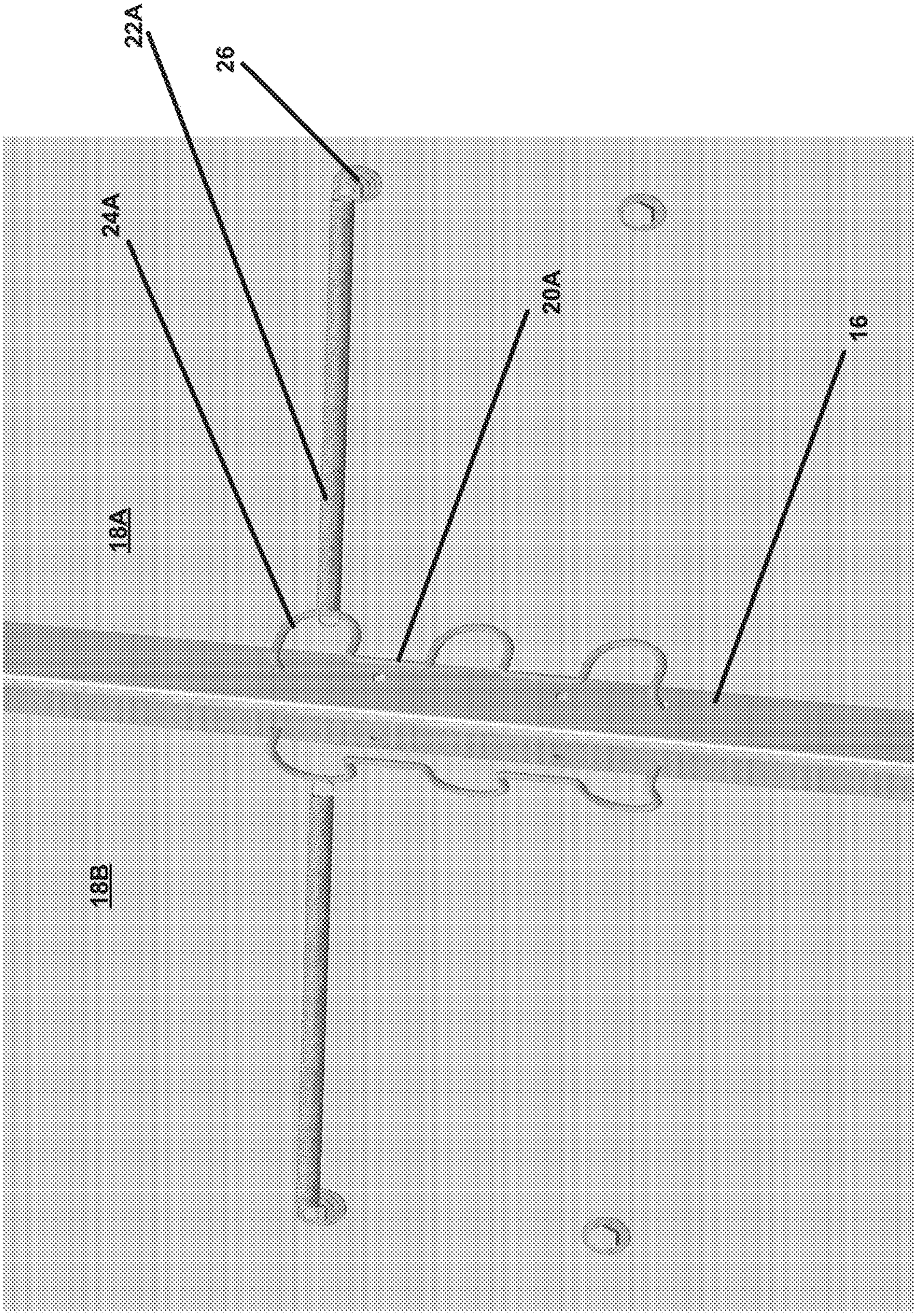
FIG. 3 is a schematic diagram that illustrates in close-up front elevation view an embodiment of a clip and spring arrangement according to a first spring tension for an embodiment of a damper door tension adjustment system.

FIG. 3 is a schematic diagram that illustrates in close-up front elevation view the clips 20 and springs 22 of FIG. 2. Emphasis is placed on the right hand side of FIG. 3, with the understanding that a similar description of the components associated with the door 18B applies, and hence omitted here for brevity. The spring 22A is hooked (via a hook at the end of the spring 22) to the top-disposed loop 24A of the clip 20A, resulting in a tension for the spring 22A of a defined value. The clip 20A is directly connected to the structural member 16. For instance, the structural member 16 may comprise holes or slots through which the ends of the clip 20A are inserted according to an interference fit to secure the clip 20A to the structural member 16. In some embodiments, the ends of the clip 20A may be fastened to the structural member 16, either via welding, tacking, stapling, or other securing means. The other end of the spring 22A is fixably coupled to the door 18A via an affixing means 26, which in one embodiment, comprises a threaded bolt with an arrangement of nuts and washer(s), though other known mechanisms for securing the spring end to the door 18A may be used. In one embodiment, the end of the spring 22A fixably coupled to the door 18A comprises a hook that is sandwiched between two nuts of the affixing means 26, with the nut beneath the hook adjacent a washer that is in turn adjacent a surface of the door 18A. On the other side of the door 18A is another washer sandwiched between the door surface and a nut that is secured to the opposing end of the threaded bolt. Variations to the affixing means 26 in terms of types of components and/or order of components may be implemented, and the example described above is merely for illustration. Note that the location of the affixing means 26 may be varied in conjunction with a like displacement of the clip 20, or in some embodiments, displaced to a different location of the door 18A relative to the same location of the clip 20A as shown in FIG. 3. For instance, using a longer spring, the affixing means 26 may be disposed through the door 18A at any location more peripheral to outside edges of the door 18A. As another example, the clip 20A may be located proximal to one end of the structural member 16 (e.g., towards the top), and the affixing means 26 may likewise be moved more toward the top of the door, resulting in a shorter-lengthed spring 22A. As yet another example, the clip 20A may be positioned proximal to a peripheral edge of the door 18A and the affixing means 26 located in a similar quadrant of the door 18A, yet requiring a longer length for the spring 22A. These and/or other variations in the locations of the clip 20A and/or affixing means 26 are contemplated to be within the scope of the disclosure.

Figure 4:
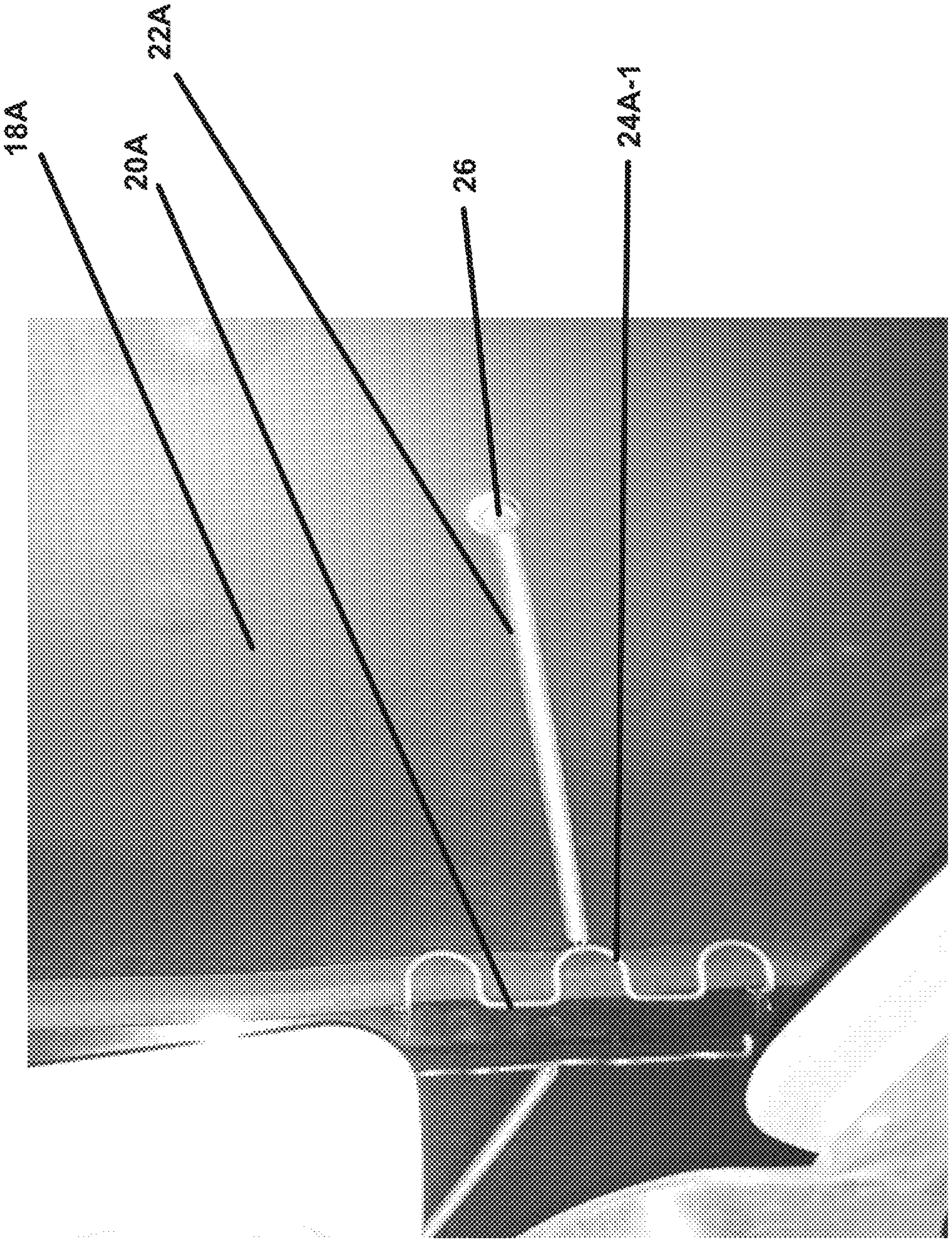
FIG. 4 is a schematic diagram that illustrates in close-up front elevation view an embodiment of a clip and spring arrangement according to a second spring tension for an embodiment of a damper door tension adjustment system.
Figure 5:
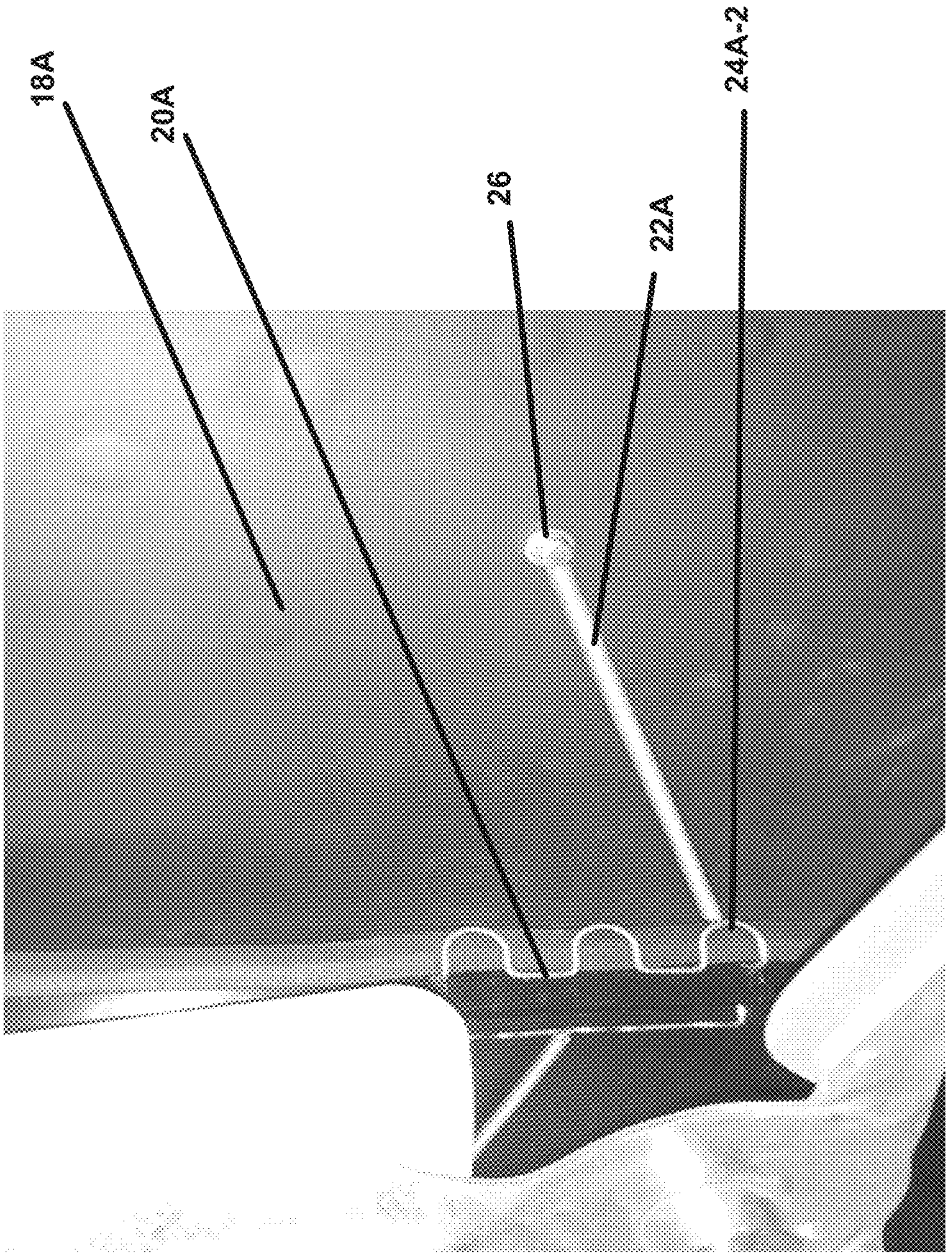
FIG. 5 is a schematic diagram that illustrates in close-up front elevation view an embodiment of a clip and spring arrangement according to a third spring tension for an embodiment of a damper door tension adjustment system.

FIGS. 4-5 show the connection of the hook at one end of the spring 22A to other loops 24 of the clip 20A to provide additional (incremental) changes to the tension of the spring 22A. Referring to FIG. 4, shown is the clip 20A and the spring 22A coupled (hookably or detachably coupled) via the hook to the center loop 24A-1 and the other end of the spring fixably coupled to the door 18A via the affixing means 26. Based on this connection (to the center loop 24A-1), the spring tension is incrementally increased (resulting in more force opposing the air-blown door opening, and increased force retracting the door 18A back to the closed position). Referring to FIG. 5, shown is the clip 20A and the spring 22A coupled (hookably or detachably coupled) via the hook to the bottom loop 24A-2 and the other end of the spring fixably coupled to the door 18A via the affixing means 26. Based on this connection (to the bottom loop 24A-2), the spring tension is further incrementally increased (resulting in even more force opposing the air-blown door opening, and an additional increase in force retracting the door 18A back to the closed position). Note that the clip 20A and affixing means 26 arrangement may be adjusted such that tension increases are not simply from top to bottom (e.g., a first tension may be a center connection, and increased tension may be achieved via connections above or below the center connection, among other variations). Again, a person may simply unhook the spring 22 from a given loop 24 (e.g., 24A, 24A-1, 24A-2, all collectively references as loop 24) and re-hook the spring 22 to one of the other loops 24. Or, the user may simply slide the hook to another loop 24 to achieve the adjustment in spring tension (and adjustment in door opening and closing forces).

Figure 6:
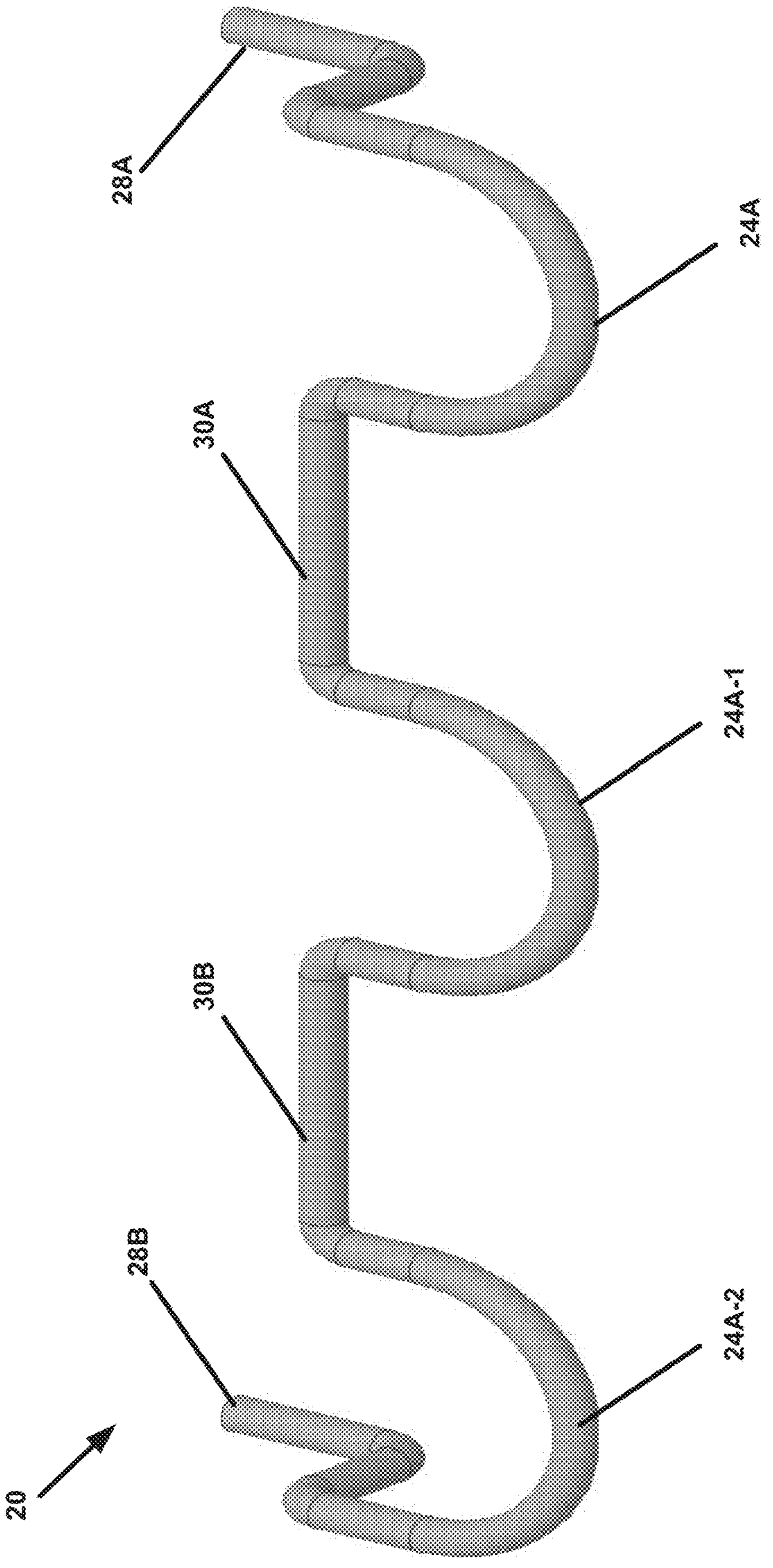
FIG. 6 is a schematic diagram that illustrates in perspective view an example clip for an embodiment of a damper door tension adjustment system.
Figure 7A:
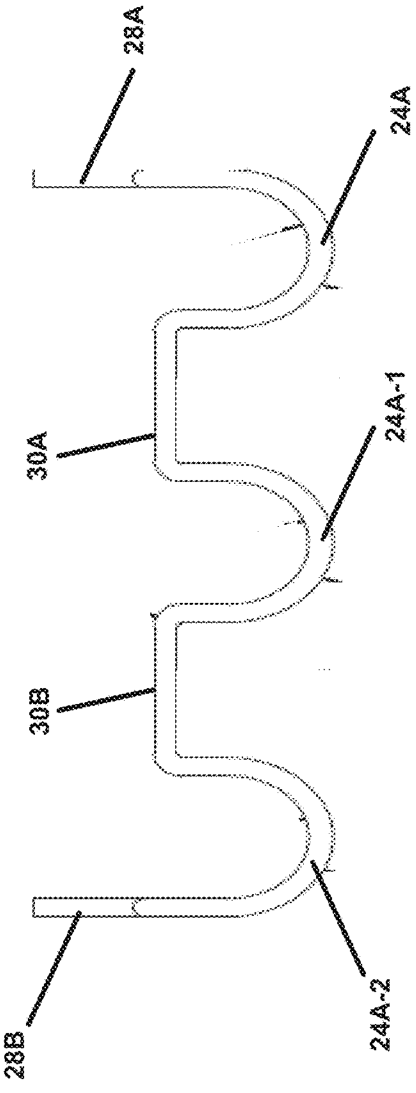
FIGS. 7A-7C are schematic diagrams that illustrate different views of the example clip of FIG. 6.
Figure 7B:
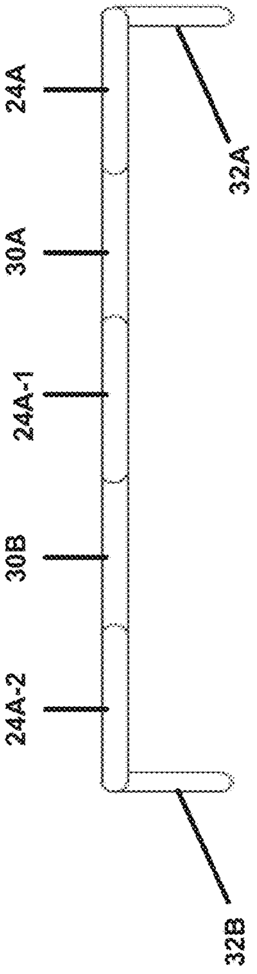
Figure 7C:
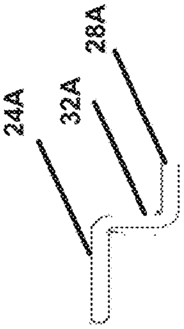
Figure 8:
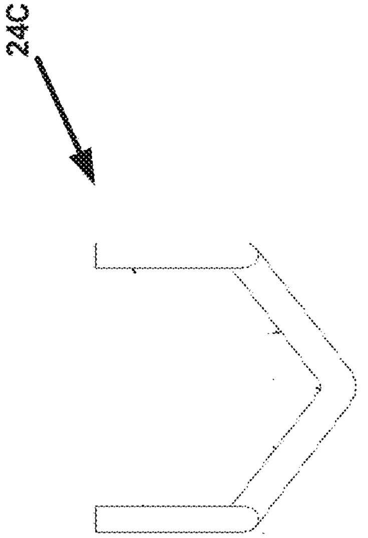
FIG. 8 is a schematic diagram that illustrates an example geometry for a spring end constraining segment for a clip for an embodiment of a damper door tension adjustment system.
Figure 10:
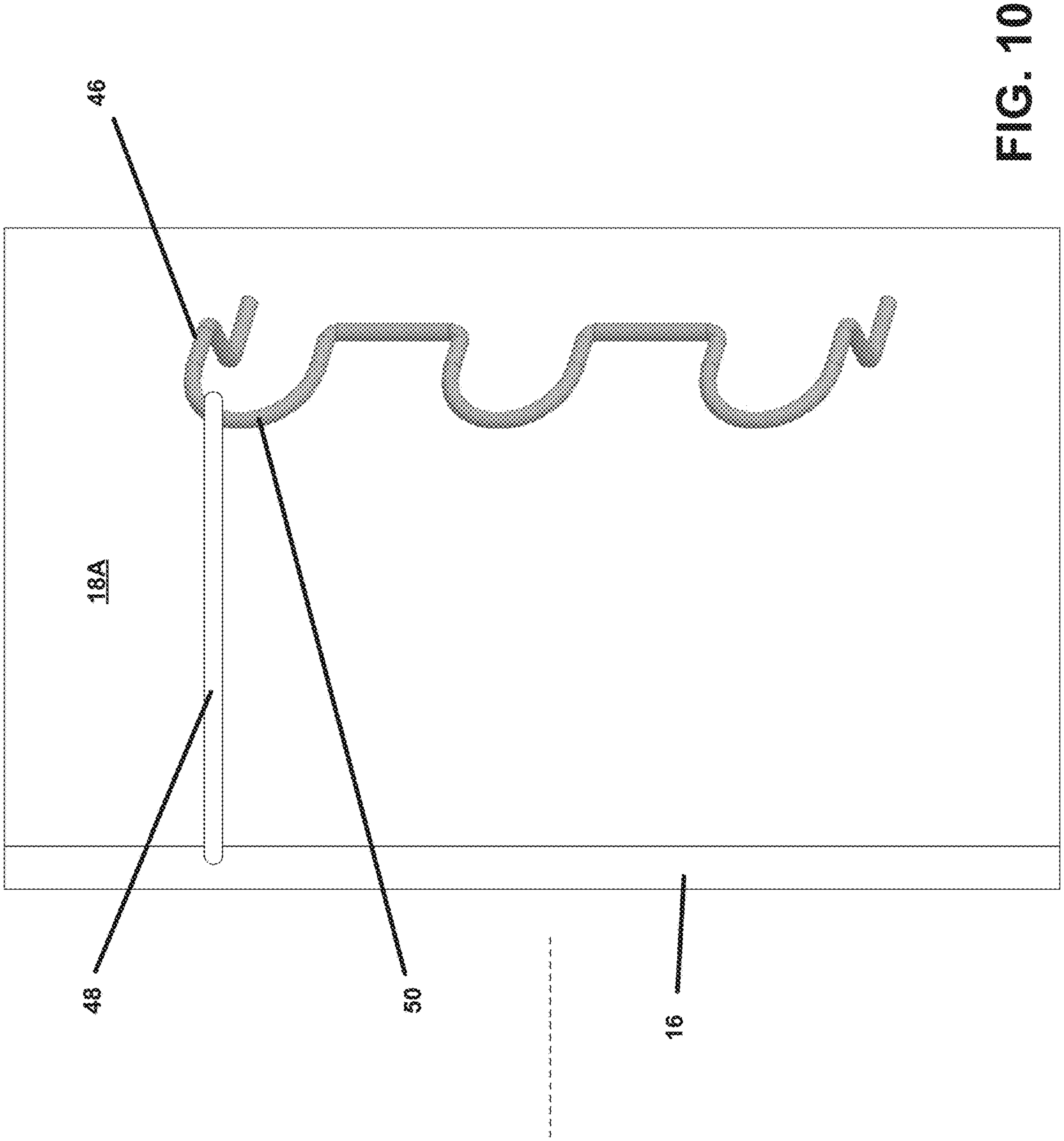
FIG. 10 is a schematic diagram that illustrates another example arrangement of a clip and spring arrangement relative to a damper assembly for an embodiment of a damper door tension adjustment system.

FIG. 6 is a schematic diagram that illustrates in perspective view an example clip 20 for an embodiment of a damper door tension adjustment system. The clip 20 (which may include clip 20A or 20B) may be comprised of metal of the desired gauge (e.g., nine (9) gauge, though other gauge wire may be used depending on the desired tension and/or door forces) or plastic (e.g., including of a composite material). The clip 20 may be machined or fabricated (e.g., via a wireform machine) or may be a cast or molded part (e.g., injection molded, 3D print molded, etc.). The clip 20 may be sheet metal fabricated and/or welded in some embodiments. Though shown as a wire, the clip 20 may comprise a machined or cast bracket (e.g., of thicker dimensions and/or greater surface area) with loops 24 or molded bracket. As explained above, the clip may have two or more loops 24, with a quantity of three shown in FIG. 6. The clip 20 comprises opposing ends 28 (e.g., 28A, 28B) that are inserted through holes or slots of the structural member 16 (FIG. 2), or affixed to the door 18 (FIG. 2) in some embodiments (as shown in FIG. 10). With continued reference to FIG. 6 and additionally to FIGS. 7A-7C, disposed between the opposing ends 28 are plural spring end constraining segments 24A, 24A-1, 24A-2 separated in part by linear segments 30A, 30B. In particular, for the depicted embodiment in FIGS. 6-7C, the loop 24A is proximal to the end 28A, separated by a bridging segment 32A (also similarly constructed for the other side at end 28B and spring end constraining segment 24A-2 via bridge 32B, which enables a difference in elevation between the opposing ends 28 and the loops 24 and linear segments 30 as best shown in front elevation view of FIG. 7B and side elevation view 7C). Disposed between the spring end constraining segments 24A and 24A-1 is a linear segment 30A, and disposed between the spring end constraining segments 24A-1 and 24A-2 is a linear segment 30B. As best shown in the perspective view of FIG. 6 and top plan view of FIG. 7A, an embodiment of the spring end constraining segments 24A (collectively referred to hereinafter as spring end constraining segments 24, which includes spring end constraining segments 24A, 24A-1, 24A-2) has a geometric configuration of a contiguous segment that comes to a point (a rounded point), though in some embodiments, a spring end constraining segment 24C may have a contiguous segment that comes to an angled point as shown in FIG. 8. In some embodiments, the spring end constraining segments may be U-shaped or V-shaped. Note that the structure of the clip 20 may be modified in some embodiments as long as the spring end constraining segments 24 are retained. For instance, in some embodiments, a different mounting structure or mechanism may be used that obviates the need for the bridge 32 (or concomitant difference in elevation).

Figure 9:
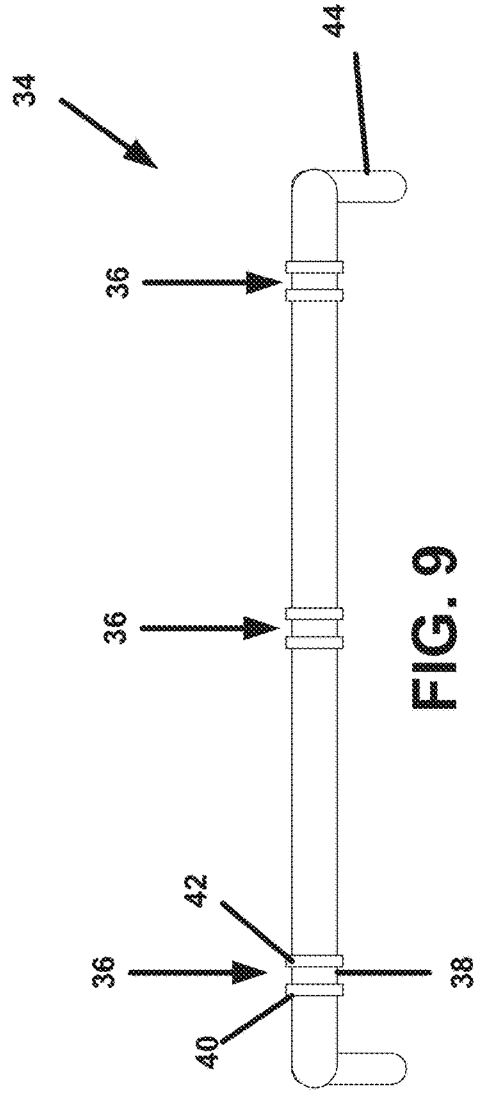
FIG. 9 is a schematic diagram that illustrates another embodiment of an example clip for an embodiment of a damper door tension adjustment system.

In some embodiments, the clip 20 may be comprised of primarily a linear segment (e.g., wire) bounded by interfering structures, as shown in FIG. 9. In particular, a clip 34 is shown in front elevation view, with plural (three in this example, though two or more than three may be used in some embodiments) spring end constraining segments 36. Each of the spring end constraining segments 36, focusing on the spring end constraining segment 36 at the left hand side, comprises a linear segment 38 bounded by interfering structures 40 and 42. The interfering structures 40, 42 may be welds, molded protrusions, or secondary locking mechanisms (e.g., hardware that crimps into place on the wire or a fabricated clip part) along the clip 34, and may be of suitable spacing and projection height to, like the radius, angle, and/or depth of the spring end constraining segments 24, constrain the movement of the hook of one end of a spring (e.g., spring 22, FIG. 2) along the length of the clip 34 during opening and closing of the doors 18. A similar function is achieved by the spring end constraining segments 24 of FIGS. 2-8. The clip 34 may be comprised of metal or plastic, like the clip 20, and though shown with a bridge 44, in some embodiments, the bridge 44 may be omitted (rendering the presence of the entire clip 34 in the same plane). Some embodiments may comprise variants of above for the spring end constraining segment 36, such as where the interfering structures 40 or 42 may resemble the teeth on a comb, where the hook on one end of the spring may be constrained between the teeth.

FIG. 10 is a schematic diagram that illustrates another example arrangement of a clip and spring arrangement relative to a damper assembly for an embodiment of a damper door tension adjustment system, and in particular, shows a clip 46 directly connected to the door 18A, with one end of a spring 48 hookably connected to a loop 50 (e.g., top loop 50) of the clip 46, and the other end of the spring 48 fixably coupled to the structural member 16. The clip 46 may be configured of similar structure and material as the clip 20 (FIG. 2) or clip 34 (FIG. 9), and the spring 48 may be similarly configured as spring 22 (FIG. 2). The spring may be coupled to the structural member 16 according to any known coupling mechanism, including via hook to holes or slots in the structural member, or via other fixing means.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the systems have been described with reference to the example embodiments illustrated in the attached figures, it is noted that equivalents may be employed and substitutions made herein without departing from the scope of the disclosure as protected by the following claims.

The invention claimed is:

1. A system, comprising:
a damper assembly, the damper assembly comprising:
- a structural member;
- a pair of doors pivotably coupled to the structural member;
- a pair of clips, each one of the pair of clips comprising plural spring end constraining segments, wherein each of the plural spring end constraining segments consists of a continuous segment that comes to a defined point;
- and a pair of springs, each comprising a first end and a second end, wherein at least the first end comprises a hook, wherein for each spring, each clip, and each door:
  - the spring is hooked at the first end to one of the plural constraining segments and, at the second end, coupled to one of the pair of doors,
  - the clip is configured to accept a hookable connection to the spring at any one of the plural spring end constraining segments, and each of the plural spring end constraining segments are designed to constrain movement of the hook, when connected thereto, during opening and closing of the door.

2. The system of claim 1, wherein the spring is at a first tension when hooked to the one of the plural spring end constraining segments and at a second tension when hooked to another of the plural spring end constraining segments, the second tension different than the first tension.

3. The system of claim 1, wherein each clip is directly connected to the structural member and the second end of each spring is fixably coupled to a respective one of the doors.

4. The system of claim 1, wherein each clip is directly connected to a respective one of the doors, and the second end of each spring is fixably coupled to the structural member.

5. The system of claim 1, wherein each clip consists of a wire or a bracket.

6. The system of claim 1, wherein each clip consists of a metal material, a plastic material, or a composite material.

7. The system of claim 1, wherein the point is either rounded or angled.

8. The system of claim 1, further comprising a fan, wherein the pair of doors open upon fan operation and the pair of springs retract the pair of doors when the fan is turned off.

9. A system, comprising:

a damper assembly, the damper assembly comprising:

a structural member;

a pair of doors pivotably coupled to the structural member;

a pair of clips, each one of the pair of clips comprising plural spring end constraining segments, wherein each of the plural spring end constraining segments comprises a linear segment bounded on each end by an interfering structure; and a pair of springs, each comprising a first end and a second end, wherein at least the first end comprises a hook, wherein for each spring, each clip, and each door:

the spring is hooked at the first end to one of the plural constraining segments and, at the second end, coupled to one of the pair of doors, the clip is configured to accept a hookable connection to the spring at any one of the plural spring end constraining segments, and each of the plural spring end constraining segments are designed to constrain movement of the hook, when connected thereto, during opening and closing of the door.

10. The system of claim 9, wherein the spring is at a first tension when hooked to the one of the plural spring end constraining segments and at a second tension when hooked to another of the plural spring end constraining segments, the second tension different than the first tension.

11. The system of claim 9, wherein each clip is directly connected to the structural member and the second end of each spring is fixably coupled to a respective one of the doors.

12. The system of claim 9, wherein each clip is directly connected to a respective one of the doors, and the second end of each spring is fixably coupled to the structural member.

13. A system, comprising:

a damper assembly, the damper assembly comprising:

a structural member;

at least one door pivotably coupled to the structural member;

a clip comprising plural spring end constraining segments, wherein each of the plural spring end constraining segments consists of a continuous segment that comes to a defined point, wherein the point is either rounded or angled; and a spring comprising a first end and a second end, wherein at least the first end comprises a hook, the spring coupled at the first end to one of the plural spring end constraining segments and at the second end fixably coupled to the at least one door, the clip configured to accept a hookable connection to the spring at any one of the plural spring end constraining segments, each of the plural spring end constraining segments constraining movement of the hook, when connected thereto, during opening and closing of the at least one door, wherein the spring is at a first tension when hooked to the one of the plural spring end constraining segments and at a second tension when hooked to another of the plural spring end constraining segments.

14. The system of claim 13, wherein the clip is directly connected to the structural member, and the second end of the spring is fixably coupled to the at least one door.

15. The system of claim 13, wherein the clip is directly connected to the at least one door, and the second end of the spring is fixably coupled to the structural member.

16. The system of claim 13, wherein the clip consists of a wire or a bracket.

17. The system of claim 13, wherein the clip consists of a metal material, a plastic material, or a composite material.

18. The system of claim 13, wherein the damper assembly comprises an additional door that is pivotably coupled to the structural member, wherein the damper assembly further comprises:

an additional clip comprising plural spring end constraining segments, the additional clip of the same material and construction as the clip; and an additional spring comprising opposing ends, wherein at least one of the opposing ends comprises a hook, the additional spring coupled at the at least one of the opposing ends to one of the plural spring end constraining segments of the additional clip and at the other opposing end to the additional door, the additional clip configured to accept a hookable connection to the additional spring at any one of the plural spring end constraining segments of the additional clip, each of the plural spring end constraining segments of the additional clip constraining movement of the hook of the additional spring, when connected thereto, during opening and closing of the additional door, wherein the additional clip is either directly connected to the structural member or to the additional door.

19. The system of claim 18, further comprising a fan, wherein the at least one door and the additional door open upon fan operation and the spring and the additional spring retract the at least one door and the additional door when the fan is turned off.

20. The system of claim 13, further comprising a fan, wherein the at least one door opens upon fan operation and the spring retracts the door when the fan is turned off.

* * * * *